United States Patent
Weston et al.

(10) Patent No.: US 7,573,239 B2
(45) Date of Patent: Aug. 11, 2009

(54) CIRCUIT FOR MONITORING BATTERIES IN A PARALLEL CONFIGURATION WHILE UNDER LOAD

(75) Inventors: Lance Weston, East Northport, NY (US); Tony T. Li, Roslyn Heights, NY (US); John J. Ryan, Seaford, NY (US)

(73) Assignee: Honeywell International Inc., Morristown, NJ (US)

( * ) Notice: Subject to any disclaimer, the term of this patent is extended or adjusted under 35 U.S.C. 154(b) by 260 days.

(21) Appl. No.: 11/648,529

(22) Filed: Dec. 29, 2006

(65) Prior Publication Data
US 2008/0157717 A1   Jul. 3, 2008

(51) Int. Cl.
*H02J 7/00* (2006.01)
*G08B 21/00* (2006.01)
(52) U.S. Cl. .................... 320/132; 320/126; 340/636.1
(58) Field of Classification Search ................ 320/106, 320/103, 104, 123, 132; 324/426, 427, 430, 324/433, 429; 340/636.1
See application file for complete search history.

(56) References Cited

U.S. PATENT DOCUMENTS

| 5,621,394 A | * | 4/1997 | Garrick et al. .............. 340/628 |
| 6,992,487 B1 | * | 1/2006 | Steinke ....................... 324/426 |
| 2004/0001996 A1 | * | 1/2004 | Sugimoto .................... 429/61 |
| 2006/0075266 A1 | * | 4/2006 | Popescu-Stanesti et al. . 713/300 |

* cited by examiner

*Primary Examiner*—Edward Tso
*Assistant Examiner*—Ahmed Omar
(74) *Attorney, Agent, or Firm*—Husch Blackwell Sanders Welsh & Katz

(57) ABSTRACT

The invention includes a circuit to monitor batteries arranged in a parallel battery configuration for charge/discharge battery circuit operation. The circuit selectively tests for each battery's presence in a battery holder or receptacle without interrupting circuit discharging operation, e.g., physical removal, and communicates a fault condition if the battery is determined to be missing. The inventive circuit enables existing or legacy control circuitry operating with the circuit to detect individual missing batteries where the legacy control circuitry is constructed to detect only missing circuit charge paths states.

10 Claims, 3 Drawing Sheets

CIRCUIT FOR MONITORING BATTERIES IN A PARALLEL CONFIGURATION WHILE UNDER LOAD

BACKGROUND OF THE INVENTION

1. Field of the Invention

The present invention relates to monitoring a state of batteries within a multi-battery power supply, and more particularly relates to a multi-battery charge/discharge circuit, multi-battery power supply, and battery-supported electronic device, which are capable of selectively testing for a physical and electrical presence of each battery wired in parallel within the circuit, supply and device, without disconnecting the battery under test from its battery discharge path (when present in-circuit).

2. Description of the Related Art

Various battery systems are known, many rechargeable. Rechargeable battery systems or power supplies have numerous uses, being found in or used with many known electronic devices and systems, particularly portable or hand-held standalones. Some devices and systems require "uninterruptible" power supplies to assure operation of a supply-supported device, if necessary, without fail. As used herein, the term battery shall be used to describe an individual battery cell, or a multiple-cell battery unit, wherein the cells are typically arranged in a serial combination to form the battery unit, or battery. The term electronic device shall be used broadly herein to include known electronic devices and systems that include battery charge/discharge circuitry for maintaining a plurality of batteries in a ready-charge state. For example, a security or fire alarm device or system is an example of an electronic device. The term alarm system, as used herein, is used to describe any known alarm-based system or device, such as a fire or smoke detection system or device, a security system, a CO or $CO_2$ level detection system or device, etc.

Conventional battery charge/discharge circuitry includes a charge path terminal (to sink current), a discharge path terminal (to source current) and control circuitry to control battery charge/discharge operation. Such conventional circuitry, however, is unable to detect whether one of an aggregate set of batteries, fixed in place physically and maintained by the charge/discharge circuitry, is missing electrically and physically from the circuit. The legacy charge control circuitry "sees" (or electrically detects) the aggregate current source, or aggregate voltage potential at the discharge terminal, but does not "see" or readily detect, nor can verify that individual batteries are present or not present in-circuit. For that matter, conventional charge/discharge circuits require a hands-on physical removal of a battery from its receptacle to test its health, i.e., in a separate battery tester. Human error sometimes leads to a failure to replace a dead or failing battery after out-of-holder testing, or worse, we sometimes fail to re-insert a dead battery in the dead battery's holder in instances where there is no replacement battery readily available.

What is needed is a rechargeable battery circuit, multi-battery rechargeable power supply, and electronic device that includes the circuitry and/or power supply that are able to selectively test for a battery's present or missing state without disconnecting the battery from its in-circuit battery discharge path (if present), and communicating the testing result. The term "missing" as used herein is meant to describe a condition where a battery is not physically and electrically present in the circuit at its receptacle, i.e., not in-circuit.

SUMMARY OF THE INVENTION

To that end, the inventions set forth and described herein include circuitry to monitor batteries arranged in a parallel battery configuration for charge/discharge circuit operation. The inventive circuitry may selectively test for each battery's presence in a battery holder or receptacle included for holding each battery in-circuit, when present. The circuitry includes a circuit discharge path and terminal, and a circuit charge path and terminal, to accommodate normal charge/discharge operation of the parallel batteries in-circuit. The discharge path is electrically connected to each battery receptacle so that the plurality of batteries can supply charge, if called upon to do so, during normal circuit operation. The circuit charge path supplies current to charge the batteries during normal circuit operation.

To test for a battery's in-circuit physical and electrical presence, the inventive circuit selectively tests each receptacle (for battery presence therein) without the need to disconnect the battery from the circuit discharge path connection (if present). As such, circuit discharge operation need never be interrupted while testing for individual battery presence in-circuit. The inventive circuitry generates a signal for communicating the missing battery state. The "missing battery" signal may drive an LED, audible alarm, or other element to communicate the missing battery state locally, or may be transmitted to a distant device, system or network. The inventive circuitry may operate to enable existing or legacy control circuitry comprising an electronic device or system to notice individual missing batteries where the legacy control circuitry is functionally constructed to detect only missing circuit charge path states.

Another embodiment of the invention includes a rechargeable multi-battery power supply for maintaining a plurality of batteries electrically connected in circuit via a plurality of battery receptacles in a ready charge state. The supply includes electrical or electronic elements for selectively testing each battery receptacle to determine whether there is a battery present (electrically present) therein. The power supply includes power supply control circuitry for controlling normal charge/discharge operation of the batteries, and a charge/discharge circuit electrically connected to the control circuitry. The charge/discharge circuit is connected to the control circuitry at circuit discharge and circuit charge path terminals. The battery charging cycle may be periodic or continuous, interrupted only if the batteries are called upon to operate as charge suppliers. The power supply or system receives and is responsive to a battery selection signal, which selects a particular battery, or battery receptacle to be tested for battery presence therein. The power supply generates and provides a signal to communicate the battery test results, for example, to control an LED or device arranged to monitor the state of power supply operation. Normal battery discharge operation never need be interrupted.

The invention may further comprise an electronic system or device, such as a security alarm system, which includes charge/discharge circuitry or a power supply modeled in accord with the inventive principles set forth. The electronic device or system circuitry is able to selectively interrogate each battery receptacle included and electrically connected to the device or system to determine whether a battery is present therein. The selective testing may be conducted during normal battery charge/discharge operation without having to physically remove the battery (if present) from its discharge circuit path. The signals generated by the selective tests are constructed to complement legacy battery check systems that may normally check only for circuit charge path presence, but not for individual battery presence. A "missing" or "present" state corresponding to a missing battery determination is coded in a signal that is used to communicate the missing battery or fault state to a user, electronic device or controller.

BRIEF DESCRIPTION OF THE DRAWINGS

The foregoing and other objects, aspects and advantages will be better understood from the following detailed description of embodiments of the inventions, with reference to the drawings, in which.

DETAILED DESCRIPTION OF THE INVENTION

The inventive charge/discharge circuit, power supply and electronic device set forth and described herein maintain in a ready-charge state a set of rechargeable batteries in a parallel electrical configuration, and provides for selective testing of each individual battery's in-circuit presence without electrically disconnecting the battery from its discharge path, or interrupting normal battery supply operation (discharging operation). The figures and descriptions, however, are intended only as examples, are not exclusive, and should not be interpreted to limit the scope of the invention in any way.

Figure 1:
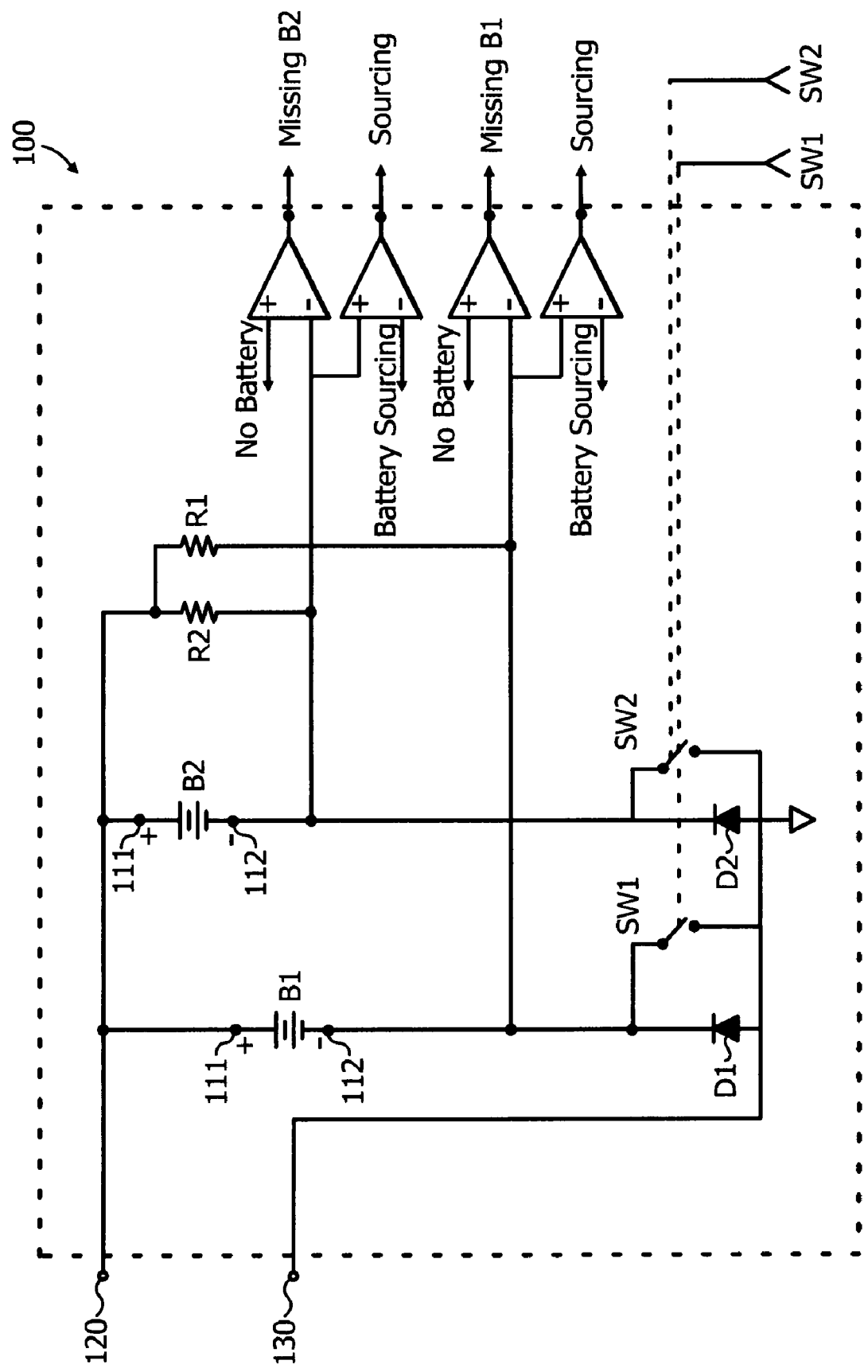
FIG. 1 is a circuit diagram that depicts one embodiment of a charge/discharge circuit of the present invention.

FIG. 1 is a schematic circuit diagram of a first embodiment of a battery charge/discharge circuit 100 of the invention. Charge/discharge circuit 100 is constructed and arranged for maintaining two (2) batteries, B1, B2, in a ready-charge state. The skilled artisan should understand that the inventive charge/discharge circuit may operate upon any number of batteries, or battery receptacles, and is not limited to the two-battery configuration depicted in FIG. 1. Charge/discharge circuit 100 includes a battery plus terminal 120 (for battery discharge or sourcing operation), and a battery minus terminal 130 (for battery charging). Battery plus terminal 120 connects to a positive battery receptacle terminal 111 of each battery receptacle wired in-circuit in the parallel circuit configuration. The positive battery receptacle terminals are required to physically hold each battery in place in the circuit, and to electrically connect to anode electrodes of batteries B1, B2 when physically present in a receptacle.

Each positive battery receptacle terminal 111 electrically connects to first ends of resistors R1 and R2, respectively, in the embodiment shown. The other or second ends of each of resistors R1 and R2 are electrically connected to one of respective blocks of comparators, one of respective cathode ends of diodes D1 and D2, one of each respective switch or pole SW1 and SW2, and to one of respective negative battery receptacle terminals 112. The electrical point so defined may be referred to hereinafter as a "compare" node. The switch common and the anode ends of diodes D1 and D2 are electrically connected to battery minus terminal 130, the charging path with the circuit so constructed. The skilled artisan should note that the circuit conventions may be reversed, without deviating from the scope and spirit of the invention. During selective testing operation, a signal is asserted at switch SW1 or switch SW2, respectively. The switching opens the respective or corresponding switch to switch the diode associated with the battery, or battery receptacle under test, in-circuit. A change in voltage potential or current draw at the respective comparators (i.e., a compare node) provides a comparator output indicative of the battery's missing state, present state, sourcing state and test state.

That is, at switching, if the discharge path is drawing current from the battery (sourcing), the battery voltage at the respective comparators swings below ground, and the battery is present in-circuit in the receptacle. Sourcing is assumed to be a battery test, even though it could very well be a result of a loss of AC power. And if current is not sourced through the discharge path, the comparator is pulled high indicating that the battery is not present. That is, where a battery is not present in its receptacle, charge/discharge circuit 100 attempts to charge the switched battery (battery receptacle) through the charge path terminal such that the voltage potential at the compare node rises. The respective comparators included in the FIG. 1 embodiment generate two (2) output signals associated with each battery or battery receptacle's to communicate a battery's missing or sourcing state. Communicating the two signals may be implemented with any available or known circuitry able to sufficiently identify that one or more batteries are missing, such as by transmitting a signal to a remote monitoring device, or using a signal to drive an LED or like device.

Figure 2:
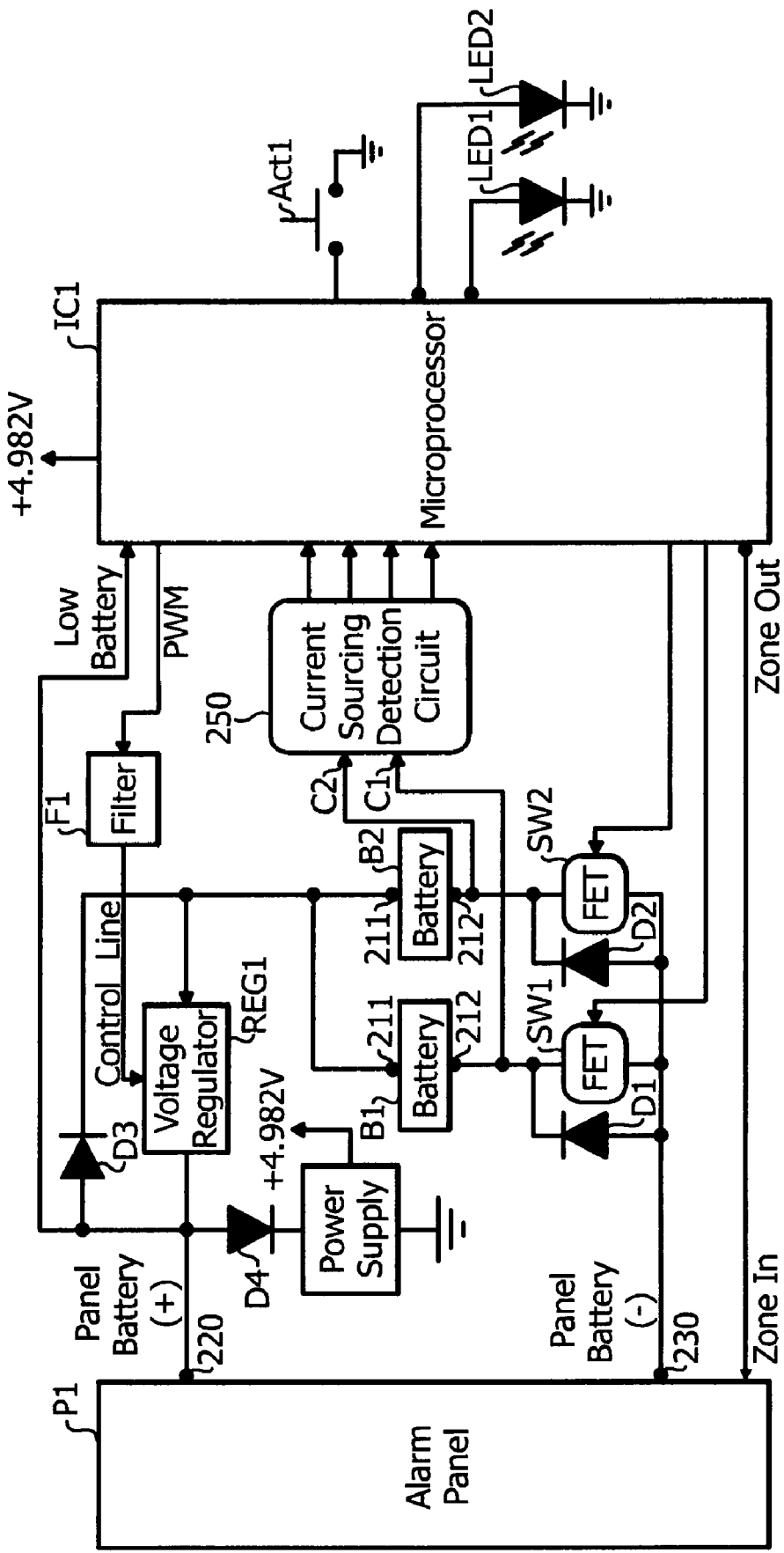
FIG. 2 is an example of an electronic device including a charge/discharge of the invention.

FIG. 2 is an electronic alarm device 200, within which a battery charge/discharge circuit that includes missing battery detection and discrimination ability is included. Device 200 includes alarm panel, P1, for controlling alarm device operation in coordination with a microprocessor, IC1. Alarm panel P1 is electrically connected to a panel plus terminal 220 (discharge), and a panel minus terminal 230 (charge). Panel plus terminal 220 also electrically connects to battery receptacle terminals 211 of each of two battery receptacles. The battery receptacles are wired in parallel to hold and make electrical contact with anode and cathode electrodes of two batteries B1, B2, when physically present in the respective receptacles. Like the FIG. 1 embodiment, the FIG. 2 circuit embodiment as shown is constructed to hold and maintain two (2) batteries. The reader should note, however, that the embodiments are presented for exemplary purposes only. The invention is not limited functionally in any way to circuits, power supplies and/or electronic devices comprising only two (2) batteries, but may implemented to operate with any number of batteries wired in parallel for charge/discharge operation, e.g., four (4) or six (6) batteries.

The panel plus terminal 220 connects to the battery receptacle terminals 211 through a voltage regulator, REG1, which regulator is provided with a diode D3 connected across it such that the diode's cathode end connects to receptacle terminals 211. The cathode end of diode D3 connects to panel plus terminal 220, and a low battery input of microprocessor IC1. The regulator REG1 is controlled in accord with a control signal, PWM, which is filtered in filter F1. A diode D4 is connected at its anode end to panel plus terminal 220, and at its cathode end to a power supply PS1. Cathode ends of batteries B1, B2, when present in-circuit, electrically connect to receptacle minus terminals 212, which further connect to one of respective cathode ends of diodes D1 and D2, one of each respective FET switches SW1 and SW2, and to one of respective ports C1, C2, of a missing battery and current sourcing detection circuit 250.

The other sides of FET switches SW1, SW2, are connected to panel minus terminal 230, and the anode ends of diodes D1, D2. Individual wires are shown connecting microprocessor IC1 to the switching control terminals of the FET switches, as well as an individual wire provided between the panel P1 and microprocessor IC1. As shown in the figure, the microprocessor IC1 also includes two (2) LEDs, LED1, LED2, for communicating a missing battery condition depending on the state of inputs C1, C2. An actuation switch ACT1 is included to allow for operator pushbutton control of battery testing.

Functionally, switching off one of FET switches SW1, SW2, opens the electrical path through the FET, and switches respective diodes D1, D2, in-circuit. A change in voltage potential or current draw at the respective ports C1, C2 (at respective compare nodes), of missing battery and current sourcing detection circuit 250, generates an output signal indicative of whether the respective battery associated with the switched FET is missing or present. If a battery is sourcing current, it must be present in-circuit. That is, if at FET switching the discharge path is drawing current from the battery (sourcing), the battery voltage at the respective inputs C1, C2 at circuit 250 swings below ground. This indicates that the battery is present in-circuit at the receptacle. Sourcing is assumed to be a battery test, even though it could very well be a result of a loss of AC power.

And if current is not sourced through the discharge path, voltages at C1, C2 swing high indicating that the battery is not present. That is, where a battery is not present, the circuit attempts to charge the switched battery (battery receptacle) through the charge path terminal regardless of whether the positive discharge path terminal is drawing current or not. In consequence, the voltage potential at C1, C2, and diode cathode voltage rises. The signals generated by switching at C1, C2, generate at least four (4) output signals, which are provided to microprocessor IC1. The four signals are associated with each of the two battery's "missing" and "sourcing" states. Communicating the states may be implemented with any available or known circuitry to generate a signal sufficient identify that a battery is missing. For example, LEDs LED1, LED2, may be used to communicate a missing or present state of batteries B1, B2, in accord with the outputs of circuit 250.

Figure 3:
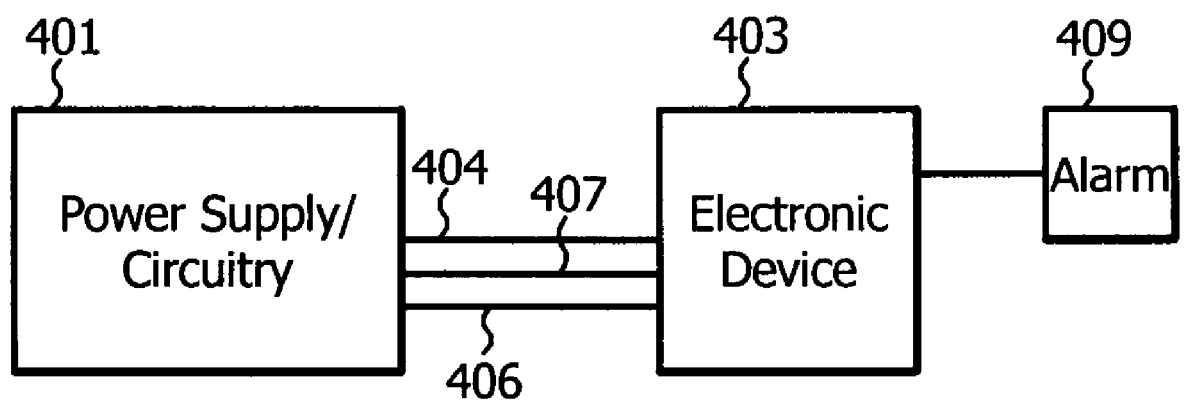
FIG. 3 is a schematic block diagram of an electronic system into which an inventive charge/discharge circuit with missing battery detection ability is included

FIG. 3 is a schematic block diagram of an electronic system or device 400, into which an inventive charge/discharge circuit or rechargeable power supply 401 is included. Rechargeable power supply 401 supports normal charge/discharge operation of a number of batteries arranged therein in parallel. Power supply operation is controlled by an electronic device portion 403 of electronic device 400. The power supply or circuitry 401 includes a discharge path 404, electrically connected to the device portion 403, so the device portion 403 can receive current from the batteries during battery discharging operation. A charge path 408 connects the power supply circuitry 401 to the device portion, and a line 407 is included to show a path for control signal exchange, battery presence detection signals, and like signals generated during operation. Such signals must be exchanged or communicated between the supply circuitry and the device portion 403. The device portion may include an alarm portion 409, in the embodiment shown.

The alarm portion 409 may be driven by the device portion to communicate the state of testing, or communicate a fault condition indicating that at least one battery is missing from its intended in-circuit position. That is, when one or more of the individual battery positions (at a receptacle included to contain in-circuit batteries) is selectively tested via system 400, the electrical connection of the battery receptacle (and the battery, if present) to the discharge path 404 is not interrupted. There is no need to physically inspect for missing batteries. If a battery is missing, the fault is communicated via alarm portion 409. To that end, alarm portion 409 may embody any known signal communication device, such as a video monitor, alarm signal sound generator, alarm signal light generator, silent alarm signal, telephone system, electronic computer based network, and like known devices, etc.

With each switch in its closed or thrown position, each respective diode is bypassed to the charge terminal (out of circuit). When a switch pole is controlled to be in its open position, the pole's respective diode is switched into the particular battery or battery receptacle charge path (diode is in-circuit). As such, the respective diode cathode voltage is the same voltage at the battery's respective compare circuit input. The switching isolates the charge path for the battery under test, requiring charge to the battery to pass through the diode, without interrupting normal operation. At the time diode D2 is switched in-circuit, a signal is generated by compare circuit 430 and provided to controller 405 of device portion 403 to convey a fault condition, where the battery is missing. The battery select signal is preferably asserted under test only for the time necessary to detect a battery's presence, and communicate it.

It will be recognized that there are many variations on the embodiments shown and described may be possible without departing from the scope and spirit of the invention. Consequently, the examples listed above are illustrative, and not meant to be exhaustive.

What is claimed is:

1. An alarm system comprising a rechargeable battery power supply, a primary electrical power supply and alarm system control circuitry, wherein the rechargeable power supply includes a charge path and a discharge path and further comprises:
    at least two (2) battery receptacles for holding and maintaining at least two (2) batteries in a parallel electrical configuration, wherein each receptacle includes a first battery contact terminal, a second battery contact terminal, and a battery holder for physically holding and electrically connecting each battery at the battery's cathode electrode and anode electrode, and wherein every first battery contact terminal is connected to the power supply discharge path;
    at least two (2) diodes, where each diode is electrically connected between the second battery contact terminal of a respective battery receptacle and the power supply charge path;
    at least two (2) resistors, where each resistor is connected at a first end to the power supply discharge path, and at a second end to a respective second battery terminal and a respective diode cathode;
    a missing battery detect circuit including an input port electrically connected to each second battery contact terminal, respective diode cathode and respective resistor second end; and
    at least two (2) switches, where each switch is connected across each respective diode, wherein a closed switch contact state electrically removes the respective diode from the respective receptacle charge path, and an open switch state electrically includes the respective diode in the respective receptacle charge path, and wherein the missing battery detect circuit detects whether the respective battery is present in its respective battery receptacle without interrupting power supply discharge operation.

2. The alarm system as set forth in claim 1, wherein the missing battery detect circuit is controlled by the alarm system control circuitry to generate a fault signal upon detecting a missing battery condition.

3. The alarm system as set forth in claim 1, wherein the at least two (2) switches are selectively controlled periodically to generate a periodic self test to test for battery presence in each battery receptacle wired in the power supply.

4. The alarm system as set forth in claim 1, wherein the switches are FETs.

5. An electrical charge/discharge circuit for maintaining a plurality of batteries in a parallel circuit configuration in a ready charge state, and for selectively testing to determine an in-circuit presence of any battery of the plurality of batteries without interrupting battery circuit discharge operation, the circuit comprising:

a circuit discharge terminal;

a circuit charge terminal;

a plurality of battery receptacles for maintaining each battery in its circuit position, wherein each battery receptacle includes first and second circuit battery terminals to electrically connect to respective battery cathode and anode electrodes of a battery present therein, wherein each first battery terminal is electrically connected to the circuit discharge terminal and wherein each second battery terminal is electrically connected to the circuit charge terminal;

a plurality of diodes including cathode ends and anode ends, wherein each diode's anode end is electrically connected to the circuit charge terminal, and each diode's cathode end is electrically connected to the respective battery receptacle second battery terminal;

a switch including a common and a plurality of switching poles, wherein each switching pole is electrically connected to a respective receptacle second battery terminal, and wherein the switch common is electrically connected to the circuit charge terminal;

a plurality of comparators, wherein each comparator is electrically connected to each respective second battery terminal, diode cathode and switching pole; and a plurality of resistors, wherein each resistor is electrically connected between the circuit discharge terminal and to each of the respective comparator, second circuit battery terminal, diode cathode and switching pole;

wherein testing for a battery's in-circuit presence includes asserting a battery test signal at a switching pole corresponding to the battery's receptacle to switch the respective diode in-circuit, and wherein the switching causes a voltage potential at the respective comparator input to change, which voltage potential change generates a signal representative of the battery's present or missing in-circuit state without interrupting the battery's discharging.

6. The electrical charge/discharge circuit as set forth in claim 5, wherein the selective testing periodically tests each battery receptacle for battery presence therein.

7. The electrical charge/discharge circuit as set forth in claim 6, wherein the selective periodic testing is controlled by a remote communication device in communication with the circuit.

8. The electrical charge/discharge circuit as set forth in claim 5, wherein the circuit comprises two (2) battery receptacles, two (2) diodes, two (2) resistors, two (2) switching poles and two (2) comparators, and wherein selective assertion of the test signal at a switching pole generates a signal indicative of a missing battery state at the comparator output if the battery associated with the respective switching pole is missing from the circuit.

9. A rechargeable battery power supply for maintaining a plurality of batteries present in a plurality of respective battery receptacles in a ready charged state, wherein the power supply is arranged to selectively test each battery receptacle for battery presence therein and communicate a result of said testing, the rechargeable power supply comprising:

a charge/discharge circuit including a charge path and a discharge path for charging and discharging the plurality of batteries;

wherein each battery receptacle is included to electrically connect each battery's anode terminal electrode to the discharge path, if present, to each first end of each resistor of a plurality resistors, to each battery's cathode terminal, if present, to a cathode end of a respective diode of a plurality of diodes, to a comparator of a plurality of comparators and to a respective switching pole of a plurality of switching poles; and wherein selectively opening a switching pole switches the respective diode associated with the pole in-circuit to test the diode's respective battery receptacle for a physical and electrical presence of a battery therein, wherein if the battery is missing, a change in voltage potential occurs at the respective diode cathode and respective comparator, indicative of the battery's in-receptacle present or missing state, without interrupting power supply discharge operation.

10. The rechargeable battery power supply as set forth in claim 9, wherein the number of diodes, receptacles, switching poles and comparators is two (2).

* * * * *